United States Patent
Weil

(10) Patent No.: US 7,641,098 B2
(45) Date of Patent: Jan. 5, 2010

(54) CONTINUOUS WELDING MACHINE FOR WELDING A PIPE BLANK

(75) Inventor: Wolfgang Weil, Mullheim (DE)

(73) Assignee: Weil Engineering GmbH, Mullheim (DE)

( * ) Notice: Subject to any disclaimer, the term of this patent is extended or adjusted under 35 U.S.C. 154(b) by 0 days.

(21) Appl. No.: 12/104,517

(22) Filed: Apr. 17, 2008

(65) Prior Publication Data

US 2008/0257938 A1 Oct. 23, 2008

(30) Foreign Application Priority Data

Apr. 17, 2007 (DE) .................. 10 2007 018 387

(51) Int. Cl.
*B23K 37/04* (2006.01)
(52) U.S. Cl. ..................... 228/44.3; 228/49.4
(58) Field of Classification Search ............... 228/147, 228/17.5, 49.3, 121.64, 121.63, 47; 219/121.64
See application file for complete search history.

(56) References Cited

U.S. PATENT DOCUMENTS

| | | | | |
|---|---|---|---|---|
| 1,975,225 A | * | 10/1934 | Cutter | 219/67 |
| 3,788,634 A | * | 1/1974 | Chauvet et al. | 269/154 |
| 4,082,935 A | * | 4/1978 | Lampietti et al. | 219/606 |
| 4,200,482 A | * | 4/1980 | Magerle | 156/443 |
| 4,726,210 A | * | 2/1988 | Weil et al. | 72/133 |
| 4,741,468 A | * | 5/1988 | Weil et al. | 228/16 |
| 4,830,258 A | * | 5/1989 | Lentz et al. | 228/17.5 |
| 5,060,840 A | * | 10/1991 | Lentz et al. | 228/49.6 |
| 5,536,915 A | * | 7/1996 | Peru et al. | 219/121.63 |
| 5,683,027 A | * | 11/1997 | Rintala | 228/49.4 |
| 5,935,378 A | * | 8/1999 | Wolki et al. | 156/425 |
| 6,514,185 B1 | * | 2/2003 | Knuppertz et al. | 493/295 |
| 6,518,535 B2 | * | 2/2003 | Yoneya et al. | 219/82 |
| 6,572,003 B2 | * | 6/2003 | Miyata et al. | 228/49.1 |
| 7,293,687 B2 | * | 11/2007 | Weil et al. | 228/44.3 |
| 2005/0103757 A1 | * | 5/2005 | Gysi | 219/121.64 |

FOREIGN PATENT DOCUMENTS

| | | |
|---|---|---|
| DE | 2002015 | 7/1971 |
| DE | 4432674 | 2/1996 |
| WO | 0029163 | 5/2000 |

* cited by examiner

*Primary Examiner*—Kiley Stoner
(74) *Attorney, Agent, or Firm*—Volpe and Koenig, P.C.

(57) ABSTRACT

A continuous welding machine (1) for welding facing sides of a pipe blank (15) bent from a material blank is provided, having a guide strut (2) for guiding the sides of the blank (15) to be welded to each other in the direction toward a welding device (3). Pipe guides (4, 5) arranged about a periphery of the guide track designed for the pipe blank (15). For the continuous welding machine (1) according to the invention, the pipe guides (4, 5) and the guide strut (2) are adjustable in the radial direction relative to a guide axis (7) for adapting to different pipe diameters, and the guide tracks (8, 9) of the guide strut (2) allocated to the sides of the pipe blank (15) to be welded and also arranged on opposite sides of the guide strut (2) are arranged at an angle to each other in a plane extending through the guide axis (7). With the help of the continuous welding machine according to the invention, selected pipes with different pipe diameters can be produced alternately.

11 Claims, 2 Drawing Sheets

CONTINUOUS WELDING MACHINE FOR WELDING A PIPE BLANK

CROSS-REFERENCE TO RELATED APPLICATIONS

This application claims the benefit of DE 10 2007 018 387.0-45, filed Apr. 17, 2007, which is incorporated herein as if fully set forth.

BACKGROUND

The invention relates to a continuous welding machine for welding facing sides of a pipe blank bent from a material blank with a guide strut for guiding the sides of the pipe blank to be welded to each other in the direction toward a welding device, as well as with pipe guides arranged over the periphery of the guide track for the pipe blank.

Chimney pipes are frequently produced from pipe sections, which each consist of an outer pipe casing and an inner pipe casing, wherein insulation is provided between the outer pipe casing and the inner pipe casing of each pipe section.

To produce the pipe segments needed for the outer pipe casing and the inner pipe casing, various production methods are already known. For example, pipe segments with different diameters can be produced on different production lines, in order to then join them in a final assembly process to form the individual chimney pipe sections.

Here, among other things, continuous welding machines of the type noted above are also used to be able to butt-weld to each other the facing sides of a pipe blank bent from a material blank. In these known continuous welding machines, in the gap of the pipe blank there is a guide strut, in order to be able to guide the sides of the pipe blank to be welded to each other in guide s arranged on opposite sides of the guide strut toward a welding device. Because the guide strut must have a certain minimum thickness for stability reasons, the edges of the pipe blank guided against each other for forming a butt seam are shifted at an angle to each other in such a way that these edges arranged at approximately the same spacing to the guide axis are initially held at a distance by the guide strut, in order to contact only at the weld point arranged before the strut. This guide, which is initially spaced apart on a common peripheral casing, but which then butts against and finally forms an angle for the edges of the pipe blank to be welded to each other, makes it necessary that the pipe blank must be clamped with considerable expenditure of force, in order to be able to press the edges of the pipe blank against each other at an angle to each other at the weld point. Therefore, in these previously known welding machines, pipe guides are needed, which are in a position to press together the edges of the pipe blank that are to be welded to each other and that are initially still spread apart by the guide strut with considerable expenditure of force at the weld point. Known welding machines have special clamping jaws, which can be pressed by contact pressure rollers and which are to be adapted to the desired form of the pipe segment. The adjustment of the known welding machines to a certain pipe diameter of the required pipe blank, however, is associated with considerable retrofitting expense.

If the production options are limited to only one production line, initially a number of pipe segments with one diameter must be produced and temporarily stored, in order to then produce a corresponding number of pipe segments with the other needed diameters. Here, the machines required for forming and welding the necessary pipe segments first have to be converted to the other pipe diameter before pipe segments of such a pipe diameter can be produced on these machines.

The production of pipe segments especially for, if necessary, also quickly changing diameters, therefore requires a considerable amount of time and space. Therefore, a continuous welding machine has also already been created, which is used for welding pre-shaped blanks into pipes (WO 00/29163). The known welding machine has a modular construction and has a support device, which is formed, for example, as a rail and on which several modules are arranged. Here the pre-shaped blank is first inserted into a run-in module, from where the blank can be conveyed further to pre-centering modules. In each of these pre-centering modules, there are loading tools for the blank, which are used for its centering and shaping before the welding module. Now, in order to be able to present the very different pipe dimensions and pipe shapes for welding in a simple way without complicated conversion of the welding machine, it is provided in the welding machine known from WO 00/29163 that along the length of the blank, the modules, which can optionally also be coupled to each other, can be moved from a work position into a waiting position and back on the common support unit.

Because the known welding machine has a modular construction and the individual modules are arranged on a carrier so that they can be exchanged and adjusted relative to each other, an optimum adjustment of the pipe shape to be welded and pipe dimensions should be provided. For example, in WO 00/29163 it is also provided that according to the length of the pipe, several run-in modules and pre-positioning modules can be provided or such modules can be quickly exchanged for adapted modules according to the diameter range of the pipe. By exchanging the centering and welding modules, various welders can also be used in a simple manner. Here, the modules can be shifted on the carrier unit so that they can be brought into an inactive waiting position, in which they do not disrupt the work process of the active module and from which they can be easily brought again into the work position.

In the continuous welding machine known from WO 00/29163, the loading tools provided in the individual modules are stored in the welding machine, in practice, as change tools and activated when needed.

In WO 00/29163 it is described that the known continuous welding machine also has a directional tool, which is to be designated as a guide strut and which is inserted into the still open blank in such a way that the edges of the blank contact the edges of this directional tool extending toward each other. This directional tool, which is pulled upward when the edges of the blank are moved toward each other by the loading tools, should produce a defined position of the edges, so that a butted position of the edges of the blank is formed.

The continuous welding machine known from WO 00/29163 thus represents only a further development of the prior state of the art, which provides different loading tools for adapting to different pipe diameters, wherein these loading tools in WO 00/29163 are provided for shortening or avoiding retrofitting times in the welding machine itself.

Indeed, in WO 00/29163, movement of the guide strut is also provided, but the guide strut is to be raised only when the edges of the blank are to be moved toward each other by the loading tool.

SUMMARY

Therefore, there is the objective of creating a continuous welding machine of the type noted above, with which pipe segments can be produced in a continuous welding method from corresponding pipe blanks by butt-welding adjacent sides or edges of corresponding pipe blanks also with different diameters without long tool conversion times and other secondary times.

To meet this objective according to the invention, the pipe guides and the guide strut can be adjusted relative to a guide axis for adapting to different pipe diameters, and the guide tracks of the guide strut allocated to the sides of the pipe blank to be welded and arranged on opposite sides of the guide strut are arranged at an angle to each other in a plane extending through the guide axis.

In the continuous welding machine according to the invention, the pipe guides and the guide strut can be adjusted in the radial direction relative to a guide axis for adapting to different pipe diameters. Indeed, the pipe guides, which are fixed in number, are arranged sufficiently tightly around the pipe periphery for smaller pipe diameters, in order to be able to apply high pressure, optionally also on all sides, to the pipe blank—at larger pipe diameters, the distance of the pipe guides, however, increases in the peripheral direction, in such a way that the distances between the pipe guides become too large to be able to join the pipe blank in the region of the weld position with the high force requirement. The continuous welding machine according to the invention therefore has a guide strut, in which the sides to be welded in the guide tracks of the guide strut are arranged on opposite sides of the guide strut at an angle to each other in a plane extending through the guide axis. These guide tracks begin at radial distances to the guide axis that are different from each other, in order to increasingly approach in a plane running through the guide axis in such a way that the sides or edges of the pipe blank guided in the guide tracks and to be welded to each other abut each other approximately at the weld point or in the welding region of the welding device. It has been shown that the pipe blanks with the guide strut provided according to the invention can be butt-welded without greater pressure application when the edges or sides of these pipe blanks to be welded are guided against each other with a constant, small axial distance, but different radial distances to the guide axis.

It is especially advantageous when the welding device is a longitudinal seam welding device, which can have, for example, welding optics or a welding torch.

To be able to butt-weld the edges of the pipe blank to be connected to each other and to be able to hold these edges approximately at the same distance to the guide axis in the region of the welding point, it is advantageous when at least one blank holder for holding down the side of the pipe blank guided in the guide track is allocated to each guide track of the guide strut advantageously in the region of the welding device.

Here it is especially advantageous when the blank holder can be adjusted for adapting to the material thickness of the pipe blank in its distance to the allocated guide track of the guide strut.

An especially advantageous embodiment according to the invention provides that at least one blank holder is formed as a blank holder wheel, which applies pressure to the pipe blank and which is supported advantageously so that it can rotate. Such a blank holder wheel can also rotate during the advance of the pipe blank, without having to relax its hold down function.

To be able to dissipate heat energy generated in the region of the welding point as quickly as possible from the pipe blank, it is advantageous when the blank holder wheel is produced from a heat-conductive material and especially from copper.

The pipe blank can be positioned correctly in the continuous welding machine according to the invention practically over the entire path if the pipe guides are formed as guide rails. Because the pipe guides guide the pipe blank only in the advancing direction and do not also have to apply a force, it can be advantageous when the guide rails provided as pipe guides have a brush facing applying pressure on the pipe blank. In the pipe guides equipped with a brush facing, the pipe blank is guided without undesirably large axial play.

Here, a preferred embodiment according to the invention provides that for advancing the pipe blank, slides that can move in the axial direction along the pipe guides are provided. Here, the structural expense can be reduced when each slide is integrated advantageously in a pipe guide.

A preferred improvement according to the invention provides that the pipe guides and the guide strut can be adjusted by a control device and can be adapted to the diameter of each pipe blank to be welded. The control device provided in this embodiment of the continuous welding machine according to the invention also allows alternating pipe segments with different diameters to be produced.

Here it is especially advantageous when at least one round bending machine is connected before the continuous welding machine for forming the needed pipe blanks from prefabricated material blanks.

Additional constructions according to the invention emerge from the description that follows.

BRIEF DESCRIPTION OF THE DRAWINGS

Below, a preferred embodiment according to the invention will be explained in more detail with reference to the drawings.

Shown are.

DETAILED DESCRIPTION OF THE PREFERRED EMBODIMENTS

Figure 1:
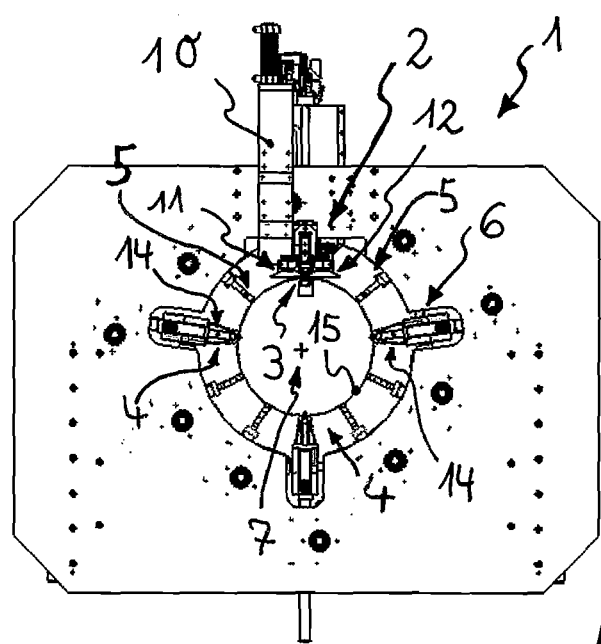
FIG. 1 is a view of a continuous welding machine for welding facing sides of a pipe blank bent from a material blank, wherein the continuous welding machine has a guide strut for guiding the sides of the pipe blank to be welded to each other and also pipe guides arranged on opposite sides of the pipe blank.

In FIG. 1, a continuous welding machine 1 is shown, which is designed for butt-welding facing sides of a pipe blank 15 bent from a material blank. The continuous welding machine 1 has a guide strut 2, which is oriented in FIG. 1 approximately vertical to the plane of the drawing and which is shown in more detail in FIG. 2 and which is used for guiding the sides of the pipe blank 15 to be welded to each other in the direction toward a welding device 3. From FIG. 1 it becomes clear that the continuous welding machine 1 has pipe guides 4 and 5, which are distributed over the periphery of the guide track designed for the pipe blank 15.

To be able to also weld pipe blanks 15 with alternate, different pipe diameters in the continuous welding machine 1, the pipe guides 4 and 5 and the guide strut 2 can be adjusted in the radial direction relative to a guide axis 7 and can be adapted in this way to the different pipe diameters. With reference to FIG. 1 it becomes clear that the pipe guides 4 and 5 are arranged around the pipe blank 15 with a relatively small distance from each other in the peripheral direction for small pipe diameters, while this distance of the pipe guides 4 and 5 to each other increases with increasing pipe diameter and for large pipe diameters it is so large that the pipe guides 4 and 5 cannot press together the edges or sides of the pipe blank 15 to be welded to each other, but instead guide the pipe blank 15 exclusively in the longitudinal direction.

Figure 2:
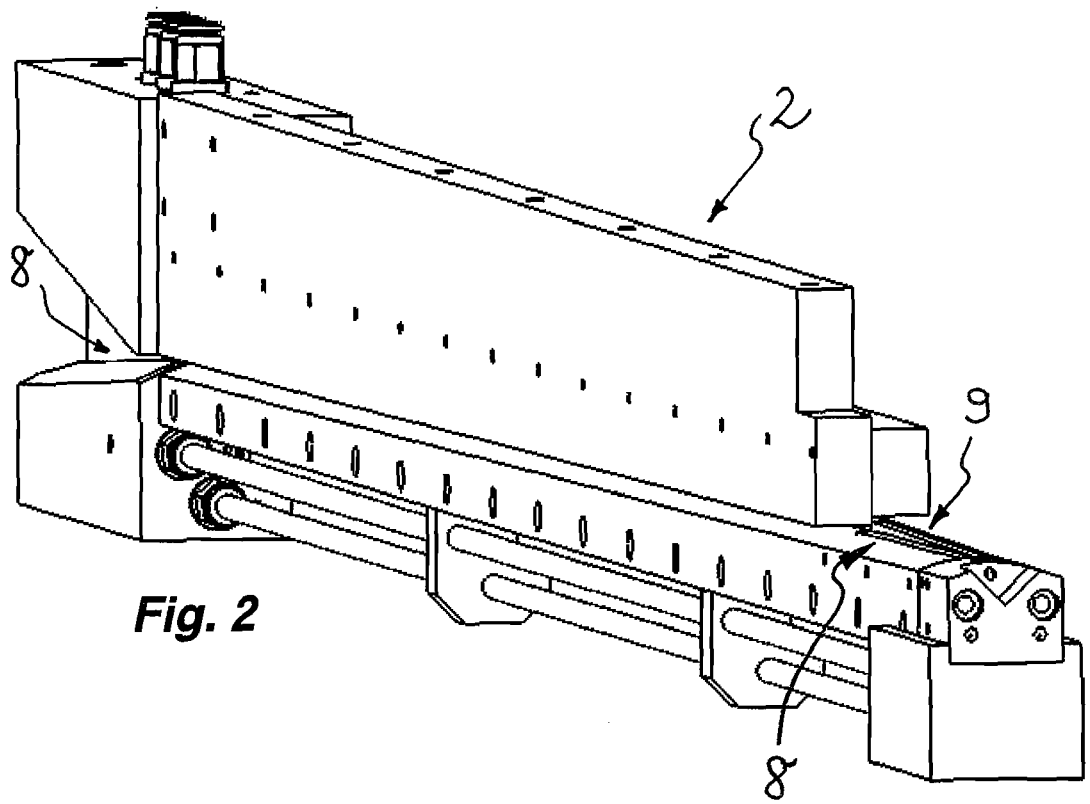
FIG. 2 is a perspective view of the guide strut of the continuous welding machine shown in FIG. 1.

In FIG. 2 it can be seen that the guide tracks 8, 9 of the guide strut 2 allocated to the sides of the pipe blank 15 to be welded and arranged on opposite sides of the guide strut 2 are arranged at an angle to each other in a plane extending approximately through the guide axis 7. Here, the guide axis defines the coaxial longitudinal axis of the pipes to be produced in the continuous welding machine 1.

The welding device 3 arranged at the free end of the guide strut 2 is constructed as a longitudinal seam welding device, which can have a welding torch or welding optics formed, for example, with a laser. The welding axis 10 of this welding device 3 is also adjustable in the radial direction toward the guide strut 2 and thus finally toward the guide axis 7.

Figure 3:
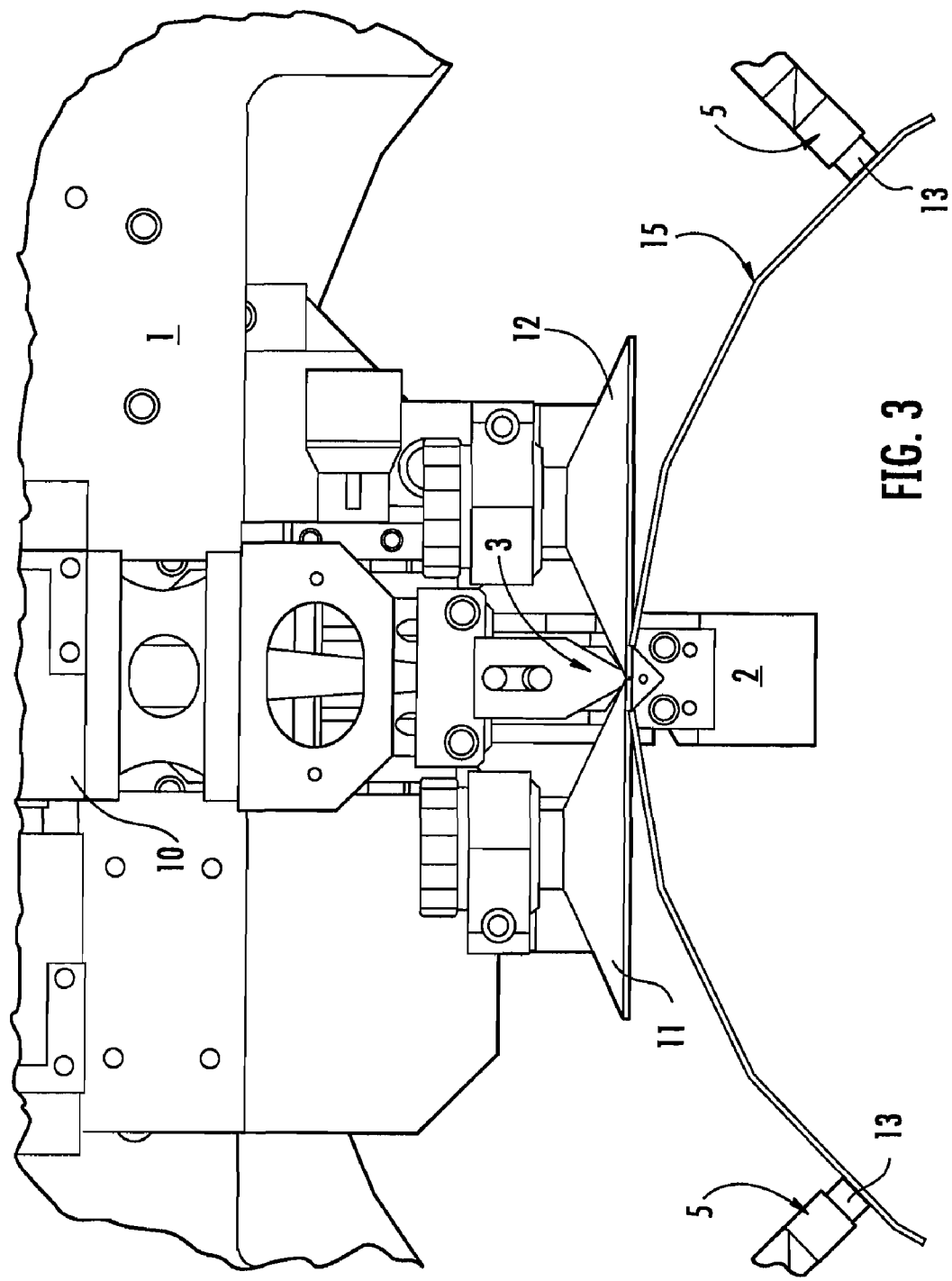
FIG. 3 is a view of the continuous welding machine from FIGS. 1 and 2 in the region between the guide strut and welding device.

From a comparison of FIGS. 2 and 3 it becomes clear that a blank holder 11, 12, which is formed as a contact wheel or as a blank holder wheel and which holds down the corresponding edge of the pipe blank 15 on the corresponding guide track 8, 9 of the guide strut 2, is allocated to each guide track 8, 9 of the guide strut 2 in the region of the welding device 3. These blank holder wheels 11, 12, which are here arranged approximately tangential to the outer surface of the pipe blank 15, but which can also be oriented at an angle or radial to the guide axis 7, are produced from a heat-conducting material and, in particular, from copper, in order to be able to dissipate heat generated in the welding region from the pipe blank 15.

The blank holder wheels 11, 12 are adjustable in distance to the respective guide track for pressing against different material thicknesses for the pipe blanks 15.

From a comparison of FIGS. 1 and 3 it can be seen that the pipe guides 4 and 5 are constructed as guide rails, which are oriented in the axial direction of the pipe blank 15 and which carry a brush facing 13 applying pressure on the pipe blank 15. Slides 14, which can be displaced or which can travel parallel to the guide axis for shifting the pipe blank 15, are integrated in the pipe guides 4.

The pipe guides 4 and 5 and the guide strut 2 are adjustable by a control device and can be adapted to the diameter of each pipe to be welded. The continuous welding machine 1 shown here is a component of a pipe production center, which also includes a round bending machine, which is connected before the continuous welding machine 1 and which is designed for shaping the pipe blanks 15 from prefabricated material blanks. In such a pipe production center, selected pipes with different pipe diameters can be produced alternately. Within this pipe production center, the rounded blank is pushed into the welding station formed by the continuous welding machine 1, in order to be clamped there automatically and to be ejected from the machine automatically after the butt-welding.

The invention claimed is:

1. Continuous welding machine (1) for welding facing sides of a pipe blank (15) bent from a material blank, the welding machine comprising a welding device, a guide strut (2) for guiding the sides of the pipe blank (15) to be welded to each other in a direction toward the welding device (3), a guide track having pipe guides (4, 5) arranged around a periphery of the guide track for the pipe blank (15), the pipe guides (4, 5) and the guide strut (2) are adjustable radially inwardly and outwardly from a guide axis (7) for adapting to different pipe diameters in a radial direction relative to the guide axis (7), and guide tracks (8, 9) of the guide strut (2) allocated to the sides of the pipe blank (15) to be welded are arranged on opposite sides of the guide strut (2) at an angle relative to each other in a plane extending through the guide axis (7).

2. Continuous welding machine according to claim 1, wherein the welding device (3) is a longitudinal seam welding device.

3. Continuous welding machine according to claim 1, wherein at least one blank holder (11, 12) for holding down the side of the pipe blank (15) guided in the guide track (8, 9) is allocated to each of the guide tracks (8, 9) of the guide strut (2) in a region of the welding device (3).

4. Continuous welding machine according to claim 3, wherein the blank holders (11, 12) are adjustable in distance to the respective guide track (8, 9) for adapting to a material thickness of the pipe blank (15).

5. Continuous welding machine according to claim 3, wherein at least one of the blank holders (11, 12) comprises a blank holder wheel to apply force to the pipe blank and is supported for rotation.

6. Continuous welding machine according to claim 1, wherein the pipe guides (4, 5, 6) are constructed as guide rails.

7. Continuous welding machine according to claim 6, wherein the guide rails have a brush facing (13) to apply force to the pipe blank (15).

8. Continuous welding machine according to claim 1, wherein slides (14) that can move along the pipe guides (4, 5) in the axial direction are provided for advancing the pipe blank (15).

9. Continuous welding machine according to claim 8, wherein each of the slides (14) is integrated advantageously in a pipe guide (4).

10. Continuous welding machine according to claim 1, wherein the pipe guides (4, 5) and the guide strut (2) are adjustable by a control device and can be adapted to the diameter of the pipe to be welded.

11. Continuous welding machine according to claim 1, wherein at least one round bending machine is connected before the continuous welding machine (1) for shaping the pipe blanks (15) from prefabricated material blanks.

* * * * *